VARIABLE THRESHOLD SIGNAL DETECTION AND ISOLATION CIRCUIT

Filed May 29, 1967 2 Sheets-Sheet 1

INVENTOR.
HERBERT R. SCHMITT
BY Joseph J. Grass
ATTORNEY

United States Patent Office 3,550,007
Patented Dec. 22, 1970

3,550,007
VARIABLE THRESHOLD SIGNAL DETECTION AND ISOLATION CIRCUIT

Herbert R. Schmitt, Arlington Heights, Ill., assignor to SCM Corporation, New York, N.Y., a corporation of New York Filed May 29, 1967, Ser. No. 642,093
Int. Cl. H04b 1/10
U.S. Cl. 325—324 11 Claims

ABSTRACT OF THE DISCLOSURE

There is disclosed interface circuitry useful in communication equipment which adapts to an input signal to a receiver and which D.C. isolates the output signal from the input signal; first and second voltage thresholds of a signal are detected by a control circuit. An output circuit includes a suitable load, which in one embodiment includes a winding for a magnetic core and in another embodiment includes a light-emitting diode. In the one embodiment, the magnetic core has an input winding connected to an oscillator; there is an output winding for the magnetic core, which is connected to a full-wave bridge rectifier. When the output circuit is completed in response to an input signal, D.C. current in the winding of the output circuit drives the magnetic core into saturation and prevents induction of voltage into the output winding. The oscillator also provides a voltage source which, when rectified, supplies voltage to the control and output circuits.

This invention relates to interface circuitry for communication equipment. In the type of equipment to which the invention relates, it is often desirable to have two threshold voltage levels. The first threshold voltage level causes an effect in the output signal and the second threshold voltage level causes the reverse effect in the output signal. By providing the second threshold level which is not identical to the first threshold level, noise which is not greater than the difference in the threshold levels cannot affect the output signal; however, too great a difference in threshold voltage levels requires that the input signal be larger in magnitude than would be required with a single threshold voltage. Therefore, it is desirable to be able to control the threshold voltage levels so that a compromise may be reached between these two considerations.

It is a feature of the invention to provide improved interface circuitry in which the threshold voltage levels of a signal can be detected and in which the output signal is D.C. isolated from the input signal.

It is a feature of the invention to provide interface circuitry having a control circuit and an output circuit. The control circuit detects first and second threshold voltage levels of an input signal. The control circuit has provision to regulate the first and second voltage threshold voltages, and provision to regulate the voltage difference between the first and second threshold voltages. A magnetic core of a square loop core transformer is driven into saturation by current flowing in a winding associated with the magnetic core of the transformer during reception of a pulse of an input signal. The output signal from the transformer is D.C. isolated from the input signal.

Other features of the invention will become apparent upon reference to the following detailed description and the accompanying drawing, in which.

Figure 4:
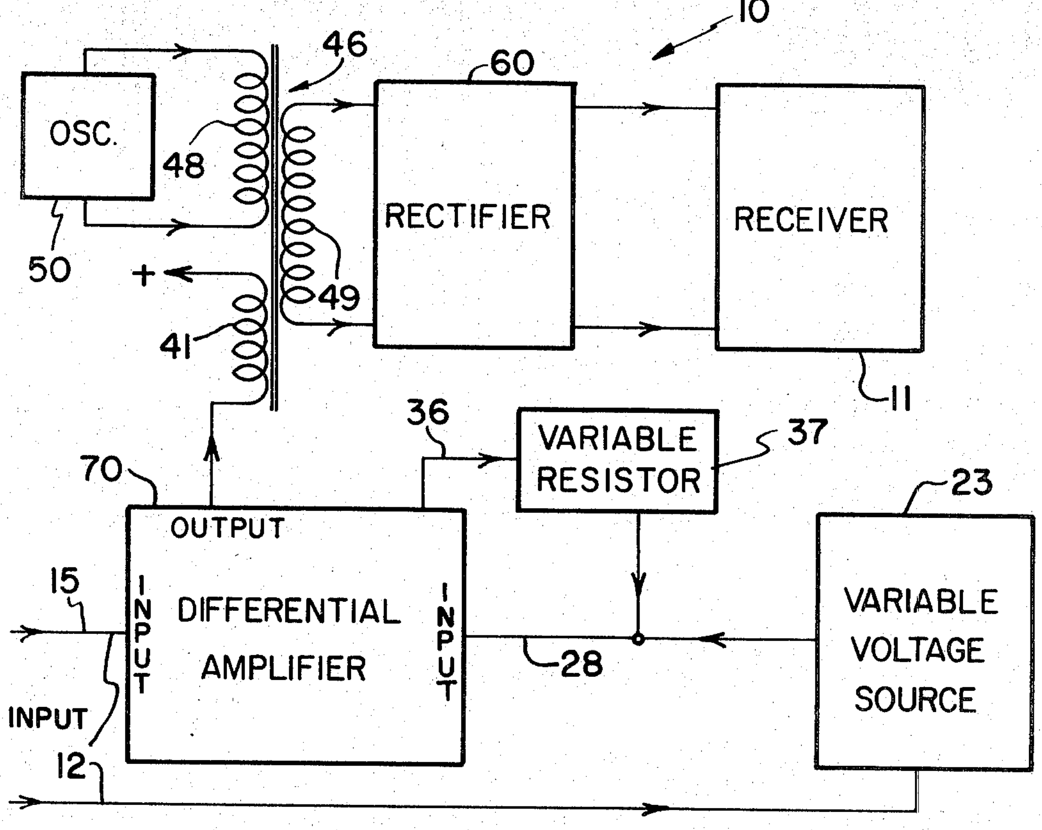
FIG. 4 is a view depicting the invention in block diagram form.

Referring now to FIG. 4 of the drawings, interface circuitry for a receiver 11 is shown in block diagram form and is generally indicated at 10. A serial input signal is received at conductors 12, one of which is connected directly to a first input conductor 15 of a differential amplifier 70 and the other of which is connected indirectly to a second input conductor 28 of the differential amplifier 70 by a variable voltage source 23. A conductor 36, including a variable resistor 37, supplies variable amounts of positive feedback from the differential amplifier 70 output to the conductor 28. The output of the differential amplifier 70 is applied to a winding 41 of a square loop core transformer 46. The transformer 46 also includes an input winding 48 which is connected directly to an oscillator 50 and an output winding 49 which is connected to the receiver 11 by a rectifier 60.

Figure 1:
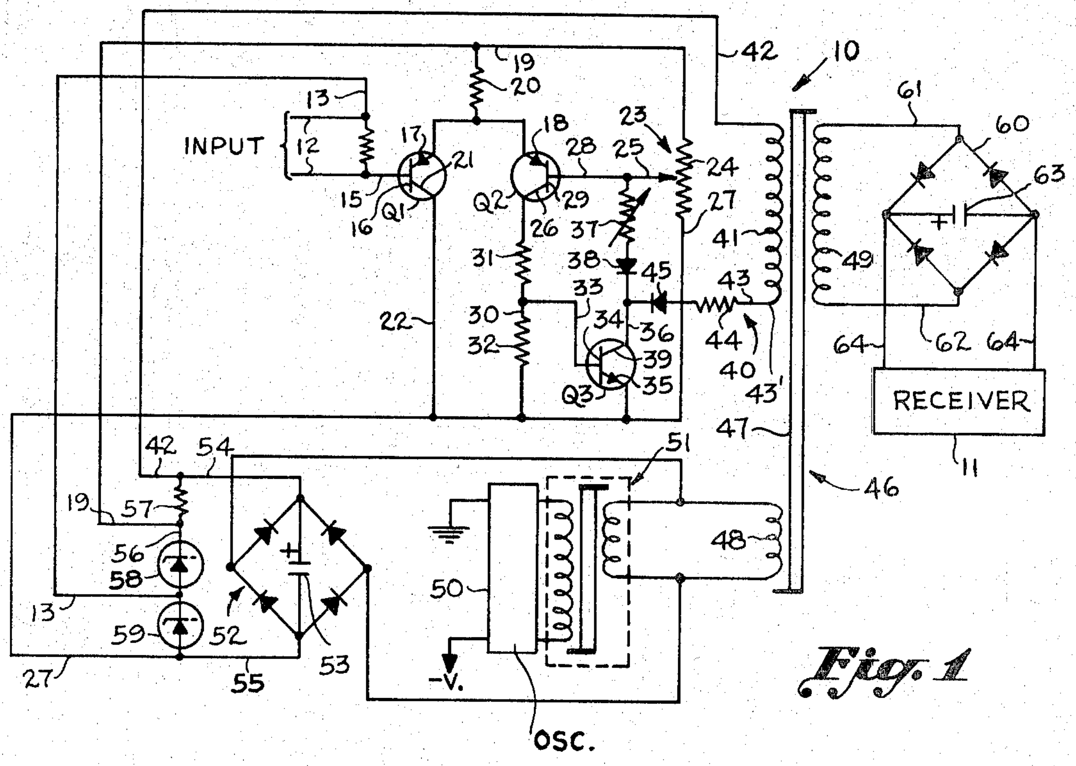
FIG. 1 is a circuit diagram of interface circuitry in accordance with the invention.

Referring now to FIG. 1 of the drawing, there is shown interface circuitry generally indicated at 10 for a receiver 11. The receiver 11 can be any suitable readout device such as a telegraphic printer. A serial input signal is received at conductors 12. Each voltage signal in a conductor 15 is applied to the base 16 of a PNP transistor $Q_1$. Bias voltage is supplied to emitter 17 of the transistor $Q_1$ and to emitter 18 of a PNP transistor $Q_2$ by a conductor 19 containing a resistor 20. Collector 21 of the transistor $Q_1$ is supplied with voltage by a conductor 22. A variable voltage source generally indicated at 23 is shown to comprise a resistor 24 with which a variable tap 25 cooperates. One side of the resistor 24 is connected to the conductor 19 which is at one voltage level, and the other side of the resistor 24 is connected to a conductor 27 which is at another voltage level. When the tap 25 is moved with respect to the resistor 24 the voltage in conductor 28 changes, as does the voltage at base 29 of the transistor $Q_2$. A conductor 30, having resistors 31 and 32, connects a collector 26 and the conductor 27. A conductor 33 is connected to the conductor 30 between the resistors 31 and 32 and to base 34 of an NPN transistor Q3. Emitter 35 of the transistor Q3 is connected to the conductor 27. A conductor 36, containing a variable resistor 37 and a diode 38, connects the conductor 28 and collector 39 of the transistor Q3. An output or load circuit generally indicated at 40 includes a winding 41 connected to a conductor 42 and to a conductor 43. The conductor 43, containing a resistor 44 and a diode 45, is connected to the conductor 36 between the resistor 37 and the diode 38, and the collector 39 of the transistor Q3.

A square loop core transformer generally indicated at 46 includes a magnetic core 47, an input winding 48 and an output winding 49.

An oscillator 50, connected to a source of direct current, is connected to a transformer 51 which supplies alternating current to the input winding 48 and to a full-wave bridge rectifier 52. The output of the rectifier is filtered by a capacitor filter 53. A conductor 54, connected to one side of the rectifier 52, is connected directly to the conductor 42, and a conductor 55 connected to the other side of the rectifier 52 is connected directly to the conductor 27. A conductor 56, connecting the conductors 54 and 55, contains a resistor 57 and Zener diodes 58 and 59. The conductor 19 is connected to the conductor 56 between the resistor 57 and the Zener diode 58, and the conductor 13 is connected to the conductor 56 between Zener diodes 58 and 59. The conductor 42 is at a more postive voltage potential than the conductor 19, the conductor 19 is at a more positive voltage potential than the conductor 13 and the conductor 13 is at a more positive voltage potential than the conductor 27. The Zener diodes 58 and 59 establish regulated voltage at conductors 19 and 27 with respect to the voltage at the conductor 13. The transformer 46 is connected to a full-wave bridge rectifier 60 by conductors 61 and 62. A capacitor filter 63 filters the output of the rectifier 60. The rectifier 60 and the filter 63 are connected to conductors 64 which provide a serial output signal to the receiver 11.

When a pulse of an input signal is applied to the conductors 12, the voltage of the base 16 of the transistor $Q_1$ increases and emitter 17 follows. The voltage of the emitter 17 increases until the voltage of the input increases to an upper threshold $T_1$ which is the voltage on base 28. When the upper threshold $T_1$ is reached, the transistor $Q_2$ will conduct, that is, turn "on." The transistor $Q_1$ serves as an emitter follower. The transistors $Q_1$ and $Q_2$ are ararnged in a circuit to form a differential amplifier. The transistors $Q_1$ and $Q_2$ track together and function independent of temperature. When the transistor $Q_2$ begins to conduct, the transistor $Q_3$ is turned "on" by a circuit through the conductor 19, the resistor 20, the transistor $Q_2$, the resistor 31, the base 34 of the transistor $Q_3$, and the conductor 27; when the transistor $Q_3$ is "on," the transistor $Q_2$ is kept "on" because as soon as the transistor $Q_3$ turns "on" there is current at the base of the transistor $Q_2$ from the collector 39 of the transistor $Q_3$, through the resistor 37 and the diode 38.

Figure 2:
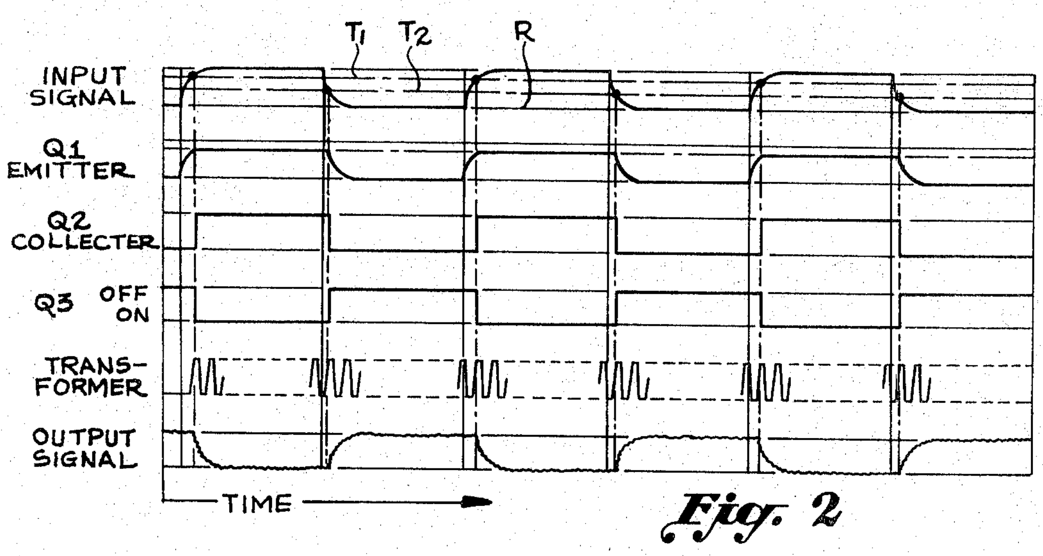
FIG. 2 is a view showing wave forms at various locations in the interface circuitry of FIG. 1.

When the transistor $Q_3$ is "on" the output circuit 40 from the conductor 42, through the winding 41, the resistor 44, the diode 45, a portion of the conductor 36, the transistor $Q_3$ to the conductor 27 is completed. When the circuit 40 is thus completed, direct current flows through the winding 41 and drives the magnetic core 47 into saturation which can be considered to effectively switch the transformer 46 to an "off" condition. The inductive effect of the input winding 48 is insufficient to induce any significant voltage in the output winding 49 when the magnetic core 47 is held in saturation. Thus, the filtered output appearing at conductors 64 is affected only to the extent that very slight ripples occur in the output signal as indicated in FIG. 2. The number of ripples is equal to the number of cycles of the oscillator 50. In the waveform indicated as "Transformer," it is impossible to represent the vast number of cycles which occur without obscuring the drawing; it is to be understood that the actual number of cycles produced by the transformer 51 for each pulse of the input signal is much larger than that shown in the drawing.

When the voltage of the pulse of the input signal reaches the lower threshold $T_2$ the voltage at the emitter 17 starts falling and the transistors $Q_2$ and $Q_3$ turn "off," thereby breaking the circuit 40 and de-energizing the winding 41. Upon de-energization of the winding 41, the alternating current in the winding 48 drives the core 47 out of saturation which can be considered to effectively switch the transformer 46 to an "on" condition. The input winding 48, the magnetic core 47 and the output winding 49 now function as a square loop core transformer and significant voltage is induced in the output winding 49. The output of the output winding 49 is rectified by the rectifier 60 and filtered by the filter 63, and a filtered D.C. signal is applied to the receiver 11 via conductors 64. The input signal applied to conductors 12 is D.C. isolated from the output signal at conductors 64, and in addition the transformer 51 is D.C. isolated from both the input signal and the output signal.

When it is desired to vary the voltage difference, known as the "offset voltage," between the upper and lower thresholds $T_1$ and $T_2$, the resistance of the variable resistor 37 can be varied; when the resistance is increased the magnitude of the offset voltage decreases, and when the resistance is decreased the value of the offset voltage is increased. When it is desired to vary the lower threshold voltage $T_2$ with respect to a reference voltage the variable tap 25 can be moved with respect to the resistor 24. The reference voltage R can be considered to be the voltage at conductor 15 when no input pulse is applied at conductors 12. When the variable tap 25 is moved closer to the side of the resistor 24 to which the conductor 19 is connected, the threshold voltage $T_2$ will be raised with respect to the reference voltage R and when the variable tap 25 is moved closer to the side of the resistor 24 to which the conductor 27 is connected, threshold voltage $T_2$ will be lowered with respect to the reference voltage R.

In FIG. 2, the "Input Signal" waveform, which depicts three pulses, occurs in conductor 15, the "$Q_1$ Emitter" waveform occurs at the emitter 17, the "$Q_2$ Collector" waveform occurs at the collector 26, the "$Q_3$" waveform occurs at conductor 33, the "Transformr" waveform occurs at the output of the transformer 51, and the "Output Signal" waveform occurs at conductors 64.

Figure 3:
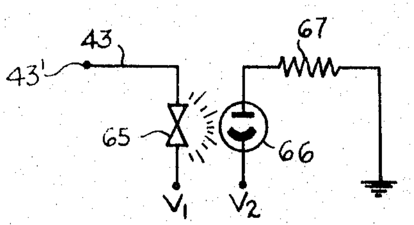
FIG. 3 is a fragmentary view showing an alternative embodiment from the embodiment shown in FIG. 1.

The embodiment shown in FIG. 3 is the same as the embodiment shown in FIG. 1, except that the transformer 46, the rectifier 60, the filter 63, and the winding 41 are omitted, and the conductor 43, instead of being connected to the winding 41, is connected directly to a light-emitting diode 65 at 43′. In addition, the light-emitting diode 65 is connected to a suitable source of D.C. voltage $V_1$; a photocell 66 is connected to a suitable source of voltage $V_2$ and acts as a switch. When the circuit through the diode 65 is completed, the light emitted from the diode 65 operates the photocell 66 to complete a circuit through a load 67 to ground. The circuit containing the photocell 66 is D.C. isolated from the circuit containing the light-emitting diode 65. The first four waveforms of FIG. 2 apply as well to the embodiment of FIG. 3.

The invention may be embodied in other specific forms without departing from the spirit or essential characteristics thereof. The present embodiment is therefore to be considered in all respects as illustrative and not restrictive, the scope of the invention being best defined by the appended claims rather than by the foregoing description, and all changes which come within the meaning and range of equivalency of the claims are therefore intended to be embraced therein.

What is claimed is:

1. For use in communication equipment: means for initiating an output signal when an input signal exceeds a first threshold and for terminating said output signal when the input signal falls below a second threshold lower than said first threshold switching means responsive to said output signal, said switching means including a magnetic core, an input winding and an output winding for said magnetic core, means for energizing said input winding with alternating current to induce voltage in said output winding, another winding for said magnetic core, and circuit means for applying said output signal to said other winding for energizing said other winding with direct current to drive said magnetic core into saturation to block induction of voltage into said output winding whenever said output signal is present.

2. The invention as defined in claim 1, wherein said input winding energizing means includes an oscillator.

3. The invention as defined in claim 1, wherein said input winding energizing means includes an oscillator; and means responsive to said oscillator for supplying direct curent to said energizing means for said other winding.

4. The invention as defined in claim 1, including means for rectifying and filtering the output of said output winding.

5. For use in communication equipment: a control circuit for initiating an output signal when an input signal exceeds a first threshold and for terminating said output signal when the input signal falls below a second threshold lower than said first threshold, said control circuit including first and second transistors, an output circuit formed in part by said control circuit, a common emitter differential amplifier comprising said first transistor and a third transistor to which the input signal is applied for turning said first transistor on during the initiation of an input signal and for turning said first transistor off during termination of the input signal, said control circuit including variable conducting means electrically cross-connecting the bases and collectors of said first and second transistors and operative when said first transistor is turned on for turning on said second transistor and operative when said first transistor is turned on for turning on said second transistor and operative when said second transistor is on for keeping said first transistor turned on, said variable conducting means regulating the voltage difference between said first and second thresholds, and means for regulating the voltage of one of said first and second thresholds with respect to a reference voltage comprising a variable voltage source connected to said first transistor.

6. The invention as defined in claim 5, including a load circuit driven by and D.C. isolated from said control circuit.

7. For use in communication equipment: detecting means for initiating a first output signal when an input signal exceeds a first threshold and for terminating said first output signal when the input signal falls below a second threshold lower than said first threshold, means electrically connected to said detecting means for regulating the voltage difference between said first and second thresholds, means electrically connected to said detecting means for regulating the voltage of the first and second thresholds with respect to a reference voltage, and means including a magnetic core and being responsive to said first output signal for providing a second output signal D.C. isolated from the input signal.

8. For use in communication equipment: detecting means for initiating a first output signal when an input signal exceeds a first threshold and for terminating said first output signal when the input signal falls below a second threshold lower than said first threshold, said detecting means including a differential amplifier having one input connected to the input signal and having a second input connected to an adjustable reference potential, means for deriving an adjustable positive feedback signal from said amplifier output for application to one of said inputs, and means including a magnetic core and being responsive to said first output signal for providing a second output signal D.C. isolated from the input signal.

9. For use in communication equipment: a control circuit including first and second transistors, an input signal applied to the emitter of the first transistor, resistive circuits cross-connecting the bases and collectors of said transistors, means for applying a variable bias voltage to the base of said first transistor, and means for varying the resistance of the resistive circuit connecting the collector of said second transistor and the base of said first transistor, whereby a circuit is created which enters a first state when said input signal increases above a first threshold level and then enters a second state when said input signal falls below said first threshold level to a second threshold level.

10. The invention as defined in claim 9, wherein said control circuit includes a third transistor, and said first and third transistors form part of a differential amplifier circuit.

11. The invention as defined in claim 9, including an output circuit formed in part by said control circuit, a magnetic core, a winding for said magnet core in said output circuit, an oscillator, a winding for said magnetic core connected to said oscillator, an output winding for said magnetic core, rectifying means connected to said output winding, and means for filtering the output of said rectifying means.

References Cited

UNITED STATES PATENTS

| | | | |
|---|---|---|---|
| 2,989,686 | 6/1961 | Pinckaers | 323—56 |
| 3,363,190 | 1/1968 | Anderson | 330—8 |

ROBERT L. GRIFFIN, Primary Examiner

A. J. MAYER, Assistant Examiner

U.S. Cl. X.R.

323—56; 330—8